Patented Aug. 3, 1937

2,088,935

UNITED STATES PATENT OFFICE 2,088,935

MANUFACTURE OF ALKYL BORATES

Thomas H. Vaughn, Niagara Falls, N. Y., assignor, by mesne assignments, to Union Carbide and Carbon Corporation, a corporation of New York No Drawing. Application August 14, 1935, Serial No. 36,120

13 Claims. (Cl. 260—98)

The invention relates to the production of alkyl borates derived from the lower aliphatic alcohols of the paraffin series, and more especially it concerns a process for the production of such borates, and mixtures thereof with the lower alcohols of the paraffin series.

These boric acid esters or alkyl borates are valuable intermediates for introducing alkyl groups into various chemical compounds; and they also may be employed, alone or in combination with other substances, for other purposes such as in welding operations as fluxing agents.

The invention has special utility in connection with the production of methyl borate and ethyl borate from boric acid.

Heretofore, the direct production of methyl borate from boric acid has not been practicable. Although the latter reacts with methyl alcohol to form methyl borate, the yields of the said borate are very low, due to the fact that the water concurrently formed in the reaction hydrolyzes the borate to the alcohol and boric acid, after only a small amount of the methyl borate is produced. Therefore, no direct methods for producing the lower alkyl borates based upon this reaction are in use. Instead, the much more expensive boric oxide is employed. The use of the latter involves considerable difficulty, since it readily absorbs moisture, forming boric acid and is then much less effective, as indicated above. Consequently, it must be handled carefully and protected from moisture at all times. The boric oxide must be very finely divided, since the formation of the alkyl borate involves a surface reaction. The caking of the boric oxide on the walls of the reaction vessel is difficult to overcome, and tends to prevent proper reaction of the caked oxide with the alcohol.

The higher alkyl borates such as butyl borate can be prepared from the relatively inexpensive boric acid by reacting the latter with the proper alcohol. The production of normal butyl borate by reacting together butanol and boric acid, and fractionally distilling the resultant reaction mixture, is described in U. S. Patent 1,668,797 to William J. Bannister. This preparation of butyl borate and the higher borates is possible, due to the property of normal butyl alcohol and the higher aliphatic alcohols of forming constant boiling mixtures with water.

Among the more important objects of the invention are: To produce methyl and/or ethyl borate in novel manner from boric acid; and to produce mixtures of methyl and/or ethyl borate with certain volatile diluents or carriers, which mixtures are especially adapted for use as vapor-phase welding fluxes. These and other objects will appear in the course of the following description.

In accordance with the present invention, methyl and/or ethyl borate, or mixtures thereof with the corresponding alcohol, are produced from compounds, or mixtures thereof, which are formed by reactions involving boric acid.

Broadly considered, the invention includes the steps of reacting an alkyl borate having three or more carbon atoms in its molecular structure, or a reaction mixture containing the said borate, with a lower aliphatic alcohol of the paraffin series, such as methanol or ethanol, or a mixture thereof. Preferably, an excess of the alcohol is used over that required to react completely with the borates present; and the alcoholysis reaction may be conducted in stages when desired, additional alcohol being added at each of the stages.

Among the higher alkyl borates suitable for use in the reaction are propyl and isopropyl borates, tributyl borate, amyl borate and hexyl borate. The butyl borate may readily be prepared in the manner proposed in the above Bannister patent; and the other borates may be produced by similar processes using the appropriate alcohols, or in other suitable manner.

The alcoholysis reaction which results in the formation of a lower alkyl borate from a higher alkyl borate of the type described supra preferably is catalyzed in such manner as to decrease the time required for the attainment of equilibrium. Thus, alkoxyfluoboric acids and their esters are effective catalysts in the process. Boron trifluoride, which may be added as the ethyl ester of ethoxy-fluoboric acid, is very efficient for use, particularly in connection with the preparation of borates containing secondary and tertiary alkyl groups, because of the lesser tendency of the fluoboric acids to decompose compounds containing these groups. The catalysts of the boron fluoride type have been used effectively in amounts as great as 5 to 10% of the reaction mixture. Mineral acids such as sulfuric acid and hydrochloric acid also effectively catalyze these alcoholysis reactions, particularly in instances wherein the normal alcohols are present.

The following examples serve to illustrate the practice of the invention applied to the production of methyl borate from butyl borate, the latter of which may have been produced by reacting boric acid and butanol.

Example I 170 grams of butyl borate, 71 grams of methyl alcohol and 1 c. c. concentrated sulfuric acid were refluxed for three hours. The reaction mixture was then distilled, and the distillate boiling below 70° C. was collected. The still residue was again treated with methyl alcohol and distilled; and these steps were repeated until all of the butyl borate had been converted to methyl borate. The distillate consisted mainly of methyl borate and methyl alcohol, which compounds form an azeotropic mixture containing 73% trimethyl borate boiling at 54–56° C. Upon distillation of this mixture, the portion distilling over within this temperature range contained practically all of the trimethyl borate.

When the pure alkyl borate is desired, this may be obtained by washing the azeotropic mixture with cold concentrated sulfuric acid. This treatment removes the alcohol; and causes separation of the mixture into two layers, the upper one of which is practically pure methyl borate. If desired, the latter may be distilled for removal of any traces of sulfur compounds present therein.

The sulfuric acid wash liquor yields, upon distillation, a quantity of the above-mentioned azeotropic mixture, which may be worked up in the manner indicated above.

Instead of using butyl borate per se as a starting material, in the foregoing example, it is possible to use the reaction mixture formed upon reacting boric acid and butanol, and distilling the resultant mixture to strip therefrom the components distilling over at temperatures up to around 150° C. at atmospheric pressure. The residual mixture contains butyl borate and butanol, from which the latter may be removed in whole or in part by further vacuum distillation at temperatures ranging from around 150° C. at atmospheric pressure, to around 190° C. at pressures around 200 mm. of mercury absolute.

Example II

Equal quantities of methyl alcohol and isopropyl borate were refluxed for four hours in the presence of .25% by weight of a mixture of hydrochloric acid and sulfuric acid in equal proportions. The reaction mixture was fractionated; and the cut thereof boiling at 54–56° C. gave a 50% yield of the azeotropic mixture of methyl alcohol and methyl borate mentioned in Example I. The isopropyl alcohol concurrently formed remained in the still pot after the distillation. The methyl borate is recoverable from the azeotropic mixture in the manner described in Example I.

It is possible to substitute ethyl alcohol for the methyl alcohol mentioned in the foregoing examples. Thus by reacting equal parts of butyl borate and ethyl alcohol in the presence of .25% of concentrated sulfuric acid, and distilling the resultant reaction product, there is formed an azeotropic mixture of ethyl alcohol and triethyl borate containing 31–32% of the latter, which mixture boils at 76.6° C. and may be separately recovered. Preferably sufficient ethyl alcohol is used to carry over all of the triethyl borate as the azeotrope during the distillation. This mixture may be used as it is for certain purposes, as hereinbefore indicated; or the ethyl borate may be recovered from this azeotrope by a treatment thereof with cold concentrated sulfuric acid in the manner described for the recovery of trimethyl borate.

The lower alkyl borates have important value as fluxes in high temperature welding operations, and for similar purposes.

It will be understood that in the only stage of the process in which water is present or is formed by reaction,—the water is rapidly removed as a constant boiling mixture with a higher alcohol such as butyl alcohol or hexyl alcohol; and that the methyl or ethyl borate produced in the final stage of the process is removed from the reaction mixture in the form of an anhydrous constant boiling mixture with the corresponding alcohol. The discovery of the possibility of thus recovering the lower alkyl borates in the form of these constant boiling mixtures has special significance since normally methyl borate and methyl alcohol boil respectively at 65° C. and at 66–67° C., and since the ethyl borate and butyl alcohol present in the reaction mixture from which ethyl borate is recovered, boil respectively at 119° C. and at 117° C. In no stage of the process is it necessary to employ elevated pressures; and preferably pressures around atmospheric or below are utilized. While the reactions are conducted at refluxing temperatures for the reagents used, obviously the reaction can be conducted at much lower temperatures, but at the sacrifice of time and usually of yields.

In the practice of the invention employing boric acid as one of the starting materials, the residue of unchanged butyl alcohol and butyl borate, or their equivalents, which remain after the removal by distillation of the methyl or ethyl alcohol and the methyl or ethyl borate, readily can be separated from each other, and the alcohol used to prepare additional higher alkyl borate, or for other purposes. Of course, the residues can be used without the separation of the ingredients, for the purpose of preparing further quantities of the higher alkyl borate.

The expression "higher alkyl", and like expressions used in the specification and claims, are intended to designate one or more alkyl groupings of the paraffin series above the ethyl grouping; and similarly, the expression "lower alkyl" and the like are used to designate one or more alkyl groupings below the propyl grouping.

The present invention presents the advantages that the lower alkyl borates can be produced at low cost, employing relatively inexpensive boric acid as a starting material. The higher alkyl alcohol used in one stage of the process is regenerated for reuse in the process.

It will be understood that nothing appearing in the specific examples set out herein is intended as a limitation of the invention, but that the conditions set out in the examples may be widely departed from within the scope of the invention as defined by the appended claims.

I claim:

1. The process of producing a lower alkyl ester of boric acid, which comprises reacting an alcohol of the paraffin series having not more than two carbon atoms in its molecule, and a higher alkyl ester of boric acid having at least three carbon atoms in its molecule, and distilling the said mixture.

2. Process for producing a lower alkyl ester of boric acid, which comprises reacting together in the presence of an acid catalyst an alkyl ester of boric acid having more than two carbon atoms in its molecule, and an aliphatic alcohol of the paraffin series having less than three carbon atoms in its molecule, and distilling the reaction mixture.

3. Process for producing an alkyl borate having not more than two carbon atoms in its molecule, which comprises reacting boric acid and an alkyl alcohol having at least three carbon atoms in its molecule, eliminating water formed in the reaction, treating the resultant reaction mixture with an alkyl alcohol having not more than two carbon atoms in its molecule, distilling the resultant reaction mixture, separately recovering a mixture containing the last-named alcohol and a corresponding alkyl borate, and separating from the last-named mixture and recovering the said alkyl borate.

4. Process for producing an alkyl borate having not more than two carbon atoms in its molecule, which comprises reacting boric acid and an alkyl alcohol having at least three carbon atoms in its molecule, eliminating water formed in the reaction, treating the resultant reaction mixture with an alkyl alcohol having not more than two carbon atoms in its molecule in the presence of an active catalyst for the resultant alcoholysis, distilling the resultant reaction mixture, separately recovering a mixture containing the last-named alcohol and a corresponding alkyl borate, and separating from the last-named mixture and recovering the said alkyl borate.

5. Process for producing ethyl borate, which comprises reacting boric acid and an alkyl alcohol having at least three carbon atoms in its molecule, eliminating water formed in the reaction, treating the resultant reaction mixture with ethyl alcohol, distilling the resultant reaction mixture, and separately recovering a mixture containing ethyl alcohol and ethyl borate which at least closely approximates a constant boiling mixture thereof.

6. The process for producing methyl borate, which comprises reacting boric acid and butyl alcohol, eliminating water formed in the reaction, treating the resultant reaction mixture with methyl alcohol, distilling the resultant reaction mixture, and separately recovering a mixture containing methyl alcohol and methyl borate in amounts at least closely approaching an azeotropic mixture of these compounds.

7. Process for producing a methyl ester of boric acid, which comprises reacting together methyl alcohol and an alkyl ester of boric acid having more than two carbon atoms in its molecule, distilling the reaction mixture, separately recovering therefrom a mixture of approximately azeotropic proportions containing a major portion of the said methyl ester of boric acid and a minor portion of methyl alcohol, and separating from the last-named mixture and recovering the said methyl ester.

8. Process for producing a lower alkyl borate, which comprises reacting together methyl alcohol and normal tributyl borate, and distilling the said mixture.

9. Process for producing a lower alkyl borate, which comprises reacting together methyl alcohol and normal tributyl borate, distilling the said mixture, and separately recovering therefrom a mixture of at least approximately azeotropic proportions containing methyl alcohol, and which mixture is rich in trimethyl borate.

10. Process for making a volatile fluxing agent for use in welding metals, which comprises reacting together in the substantial absence of water an aliphatic alcohol of the paraffin series having less than three carbon atoms in its molecule, and a higher alkyl borate having at least three carbon atoms in its molecule, distilling the said mixture, and separately recovering a fraction containing a high content of an alkyl borate having less than three carbon atoms in its molecule, and an alcohol of the paraffin series having less than three carbon atoms in its molecule.

11. Process for making a volatile fluxing agent for high temperature welding operations, which comprises reacting together boric acid and an alkyl alcohol having at least three carbon atoms in its molecule, eliminating water formed in the reaction, treating the resultant reaction mixture with an alcohol selected from the group thereof consisting of methyl alcohol and ethyl alcohol, distilling the reaction mixture therefrom, and separately recovering an at least approximately azeotropic mixture containing an alkyl borate having not more than two carbon atoms in its molecule and a corresponding aliphatic alcohol of the paraffin series.

12. Process for making a volatile fluxing agent adapted for high temperature welding operations, which comprises reacting together butanol and boric acid, eliminating water formed in the reaction, treating the resultant butyl borate with methyl alcohol, distilling the reaction mixture therefrom, and separately recovering a mixture containing a major portion of methyl borate and a minor portion of methyl alcohol.

13. Process for producing an alkyl borate having not more than two carbon atoms in its molecule, which comprises reacting boric acid and an alkyl alcohol having at least three carbon atoms in its molecule, eliminating water formed in the reaction, treating the resultant reaction mixture with an alkyl alcohol having not more than two carbon atoms in its molecule in the presence of an active alcoholysis catalyst selected from the group thereof consisting of the alkoxyfluoboric acids and their esters and boron trifluoride, distilling the resultant reaction mixture, separately recovering a mixture containing the last-named alcohol and a corresponding alkyl borate, and separating from the last-named mixture and recovering the said alkyl borate.

THOMAS H. VAUGHN.